(12) United States Patent
Gruber

(10) Patent No.: US 6,519,624 B1
(45) Date of Patent: Feb. 11, 2003

(54) SYSTEM FOR TRANSMITTING/RECEIVING DATA RECORDS AMONG COMPUTER NODES WITH COMMUNICATION APPLICATIONS VIA AN INTERNET OR VIA A BROADBAND CONNECTION DEPENDING ON THE TYPE OF DATA RECORDS

(75) Inventor: Wolfgang Gruber, Markgröningen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/300,475

(22) Filed: Apr. 28, 1999

(30) Foreign Application Priority Data

Apr. 30, 1998 (DE) .......................................... 198 19 292

(51) Int. Cl.⁷ ............................................... G06F 15/16
(52) U.S. Cl. ....................... 709/200; 709/203; 709/217; 709/227; 709/238
(58) Field of Search ................................ 709/200, 203, 709/217, 227, 238, 248; 370/355, 352

(56) References Cited

U.S. PATENT DOCUMENTS

| 5,732,078 | A | * | 3/1998 | Arango | 370/355 |
| 5,761,439 | A | * | 6/1998 | Kar et al. | 709/248 |
| 5,854,841 | A | * | 12/1998 | Nakata et al. | 380/49 |
| 5,944,795 | A | * | 8/1999 | Civanlar | 709/227 |
| 6,272,127 | B1 | * | 8/2001 | Golden et al. | 370/352 |

FOREIGN PATENT DOCUMENTS

WO    WO 97/26725    7/1997

OTHER PUBLICATIONS

Etschberger, Konrad: Suters, Tom: "Offene Komminikation auf CAN–Netzwerken" Elektronic Sep. 1993, pp. 42–44,46, 47.

Schicker, Pietro: "Datenübertragung und Rechnernetze" B.G. Teubner Stuttgart 1988, 3. Aufl., Kap. 7.4,7,5, pp. 211–219.

Japanese Patent Abstract for Japanese Patent Application 0923333085 A dated Sep. 5, 1997.

* cited by examiner

Primary Examiner—Zarni Maung
Assistant Examiner—Nabil El-Hady
(74) Attorney, Agent, or Firm—Sughrue Mion, PLLC

(57) ABSTRACT

A method for transferring a data record from a first computer node (CN1) to a second computer node (CN3), as well as transmission-side and receiving-side computer nodes (CN1, CN3) and communications applications (CA1, CA3) to put the method into practice. The data record to be transferred is transmitted to a communications application (CA1) of the first computer node (CN1). This communications application (CA1) identifies the type of data record and transmits the data record, using different modes depending on the type of data record identified, to a communications application (CA3) of the second computer node (CN3), which then delivers the data record to the second computer node (CN3). The communications application (CA1) establishes a point-to-point broadband connection between the first computer node (CN1) and the second computer node (CN3) for the data record, and transmits the data record via this broadband connection if a data record of the first type is identified. If a data record of the second type is identified, the communications application (CA1) transmits the data in a connectionless fashion via an internet (KN1). The communications application (CA3) of the second computer node (CN3) receives a data record to be delivered in a different way, depending on the type of data record, and for the delivery, switches transparently between the different methods of receipt.

15 Claims, 2 Drawing Sheets

SYSTEM FOR TRANSMITTING/RECEIVING DATA RECORDS AMONG COMPUTER NODES WITH COMMUNICATION APPLICATIONS VIA AN INTERNET OR VIA A BROADBAND CONNECTION DEPENDING ON THE TYPE OF DATA RECORDS

This application is based on and claims the benefit of German Patent Application No. 198 19 292.4 filed Apr. 30, 1998, which is incorporated by reference herein.

BACKGROUND OF THE INVENTION

This invention relates to a method to transfer a data record from a first computer node to a second computer node. The invention further relates to a computer node (CN1) with a communications application (CA1) which is configured so that it transmits a data record which is transmitted to it for transfer to a second computer node (CN3) to a communications application (CA3) of the second computer node (CN3) and a computer node (CN3) with a communications application (CA3) which is configured so that it delivers to the second computer node (CN3) a data record which is transmitted to it by a communications application (CA1) of a first computer node (CN1). The invention may also be embodied as a communications application.

To work together effectively, a team that is distributed over geographically different locations must be able to exchange data among the team members' computers. The invention is based on a method of the prior art for the transfer of documents among the members of such a team.

The team members' computers are configured with web client applications and web server applications. These applications can exchange data among themselves at any time by means of TCP/IP (TCP=Transport Control Protocol, IP=Internet Protocol) protocols of an internet, which means that there is practically a permanent internet connection between these applications. To send to another team member data that relate, for example, to the layout of a document, the data are transported by the application that manages these data to the web client application of the sending team member's computer. This web client application then transmits the data over the internet to the web server application of the other team member's computer. Thus these data are provided to the latter computer. JP-A-09233085 disclose a data transmission method in which, depending on the position of the destination computer, different communications mechanisms are used to transfer data. If the destination computer is not connected to the originating computer's network, the data are thereby transmitted via the TCP/IP protocol.

SUMMARY OF THE INVENTION

It is an object of the invention to make possible an efficient and user-friendly transfer of data from a first computer node to a second computer node.

The invention teaches a method to transfer a data record from a first computer node to a second computer node.

The invention is based on the teaching that a communications application of a first computer node is responsible for the transmission of data to a communications application of a second computer, and that the data are thereby transmitted between these communications applications in different ways, depending on the type of data in question, whereby a first type of data is transmitted via an internet, and a second type of data is transmitted via a point-to-point broadband connection established for this transmission.

This method offers the advantage that the transmission times and transmission costs can thereby be reduced. A fast but expensive broadband connection is established only for a short time to transmit a special type of data. Other data are transmitted via a more economical, if slower, connectionless communications mechanism. Because this transmission takes place transparently for the user of the client application and other applications of the computer node via a uniform application interface, the solution taught by the invention is particularly user-friendly, and does not require any modifications to existing applications.

Advantageous embodiments of the invention are described in the subclaims.

The invention teaches that it is advantageous above all to make a distinction between mass data and control data, and to transmit the mass data via the broadband connection. Consequently, a relatively rapid and cost-effective transmission of control data (no time required to establish the connection, slow transmission of a relatively small quantity of data) and mass data (additional time required to establish the connection, but fast transmission of a large quantity of data) becomes possible. The efficiency can even be increased further by buffering and compressing the mass data.

BRIEF DESCRIPTION OF THE DRAWING

The invention is explained in greater detail below on the basis of one exemplary embodiment, with reference to the accompanying drawings, in which.

DETAILED DESCRIPTION OF THE INVENTION

Figure 1:
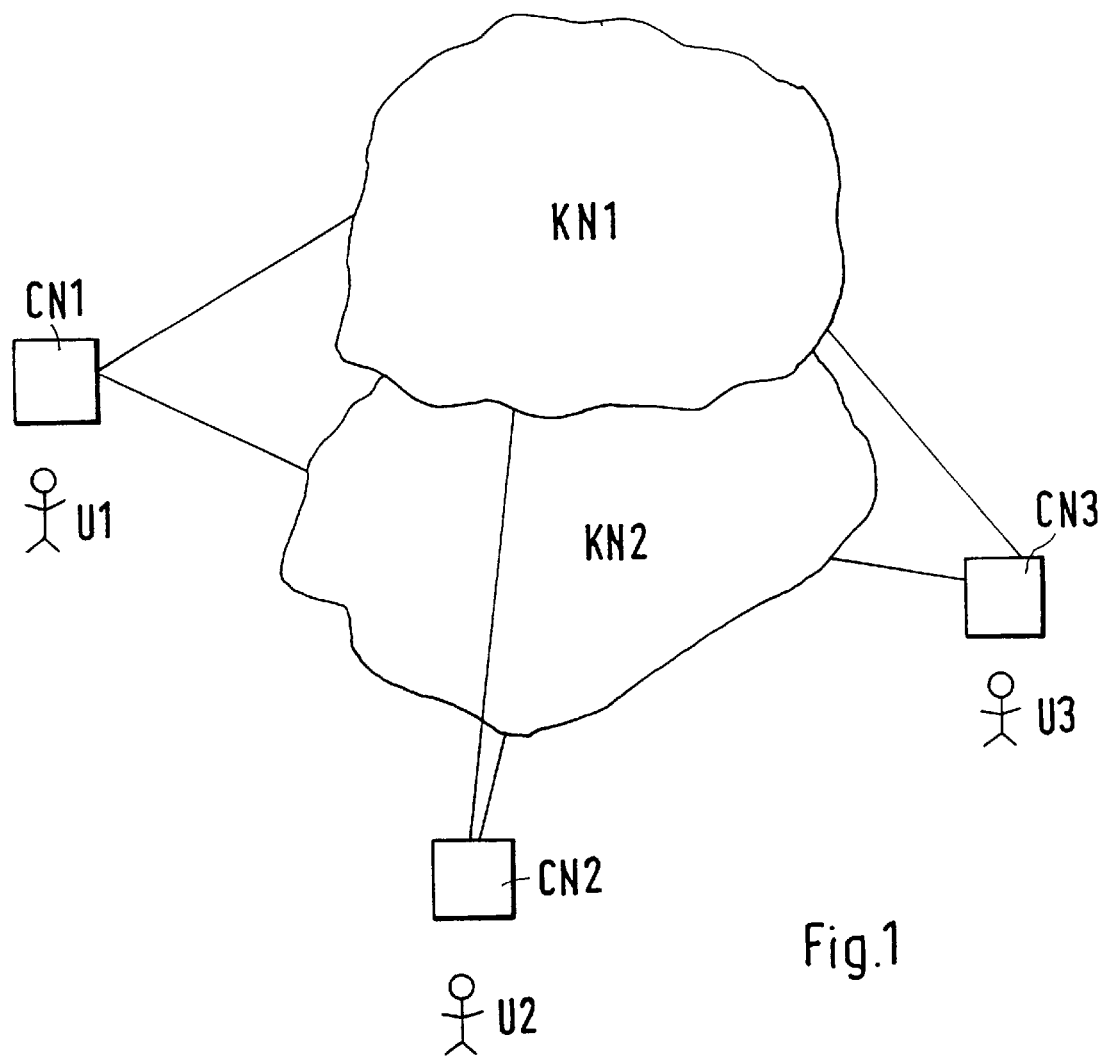
FIG. 1 is a block diagram that shows a communications system that has a plurality of computer nodes as claimed by the invention.

FIG. 1 shows three geographically separated computer nodes CN1 to CN3 and two communications networks KN1 and KN2, by means of which the computer nodes CN1 to CN3 are connected to one another. The computer nodes CN1 to CN3 are each assigned to respective users U1, U2 and U3.

The users U1, U2 and U3, with their respective computer nodes CN1 to CN3, form a team that works together to perform a task, and for this purpose must constantly exchange different types of data with one another. The number of computer nodes and the number of users in this case have been selected merely by way of example. One example of such an application is the graphics industry, where, for example, editors and production personnel must be in constant on-line communication with their central office, and from time to time must transmit large quantities of data, e.g. pictures or finished pages, at high speeds (to meet deadlines).

The computer nodes CN1 to CN3 each consist of a computer (PC, workstation, network computer), which is provided by means of corresponding communications components with the means to connect to the communications networks KN1 and KN2. On the hardware and software system platform provided by the computer there are a plurality of applications, each of which is formed by an application program, and each program of which is executed by the computer.

The communications network KN1 is an internet, by means of which the computer nodes CN1 to CN3 can exchange data by means of a TCP/IP protocol stack. In this case, the data are transmitted by the communications network KN1 to the destination computer node in a connectionless manner in the form of data packets on the basis of the destination address in the header. Physically, the communications network KN1 is formed from a plurality of different sub-networks. For example, the computer node CN1 is connected by means of an analog connection of an ISDN connection (ISDN=Integrated Services Digital Network) of a telephone network with a gateway computer in a backbone network, which for its part uses an ATM or DQDB Medium Access Protocol (ATM=Asynchronous Transfer Mode, DQDB=Distributed Queue Dual Bus). The computer node CN2 can be connected, for example, by means of an ADSL modem (ADSL=Asymmetrical Digital Subscriber Line) and the computer node CN3 can be connected, for example, to a gateway computer in the backbone network by means of a LAN (LAN=Local Area Network).

The communications network KN2 is formed by an ATM network, by means of which the broadband point-to-point connections between the computer nodes CN1 to CN3 can be established. It is also possible that the communications network KN2 in question can be another type of network that makes it possible to establish broadband point-to-point connections. The communications network KN2 can, for example, be a telephone network through which ISDN point-to-point connections are established, a network that provides the Datex-M or frame relay connections, or a transmission network via which the STM can establish point-to-point connections.

In this case, it is also naturally possible for the communications networks KN1 and KN2 to overlap in a physical sense to some extent, for example if a telephone network is used as the access network into an internet backbone network, and at the same time this telephone network is used for the establishment of ISDN point-to-point connections. In that case, it is advantageous that only one communications component and one network connection are required in the corresponding computer nodes.

Figure 2:
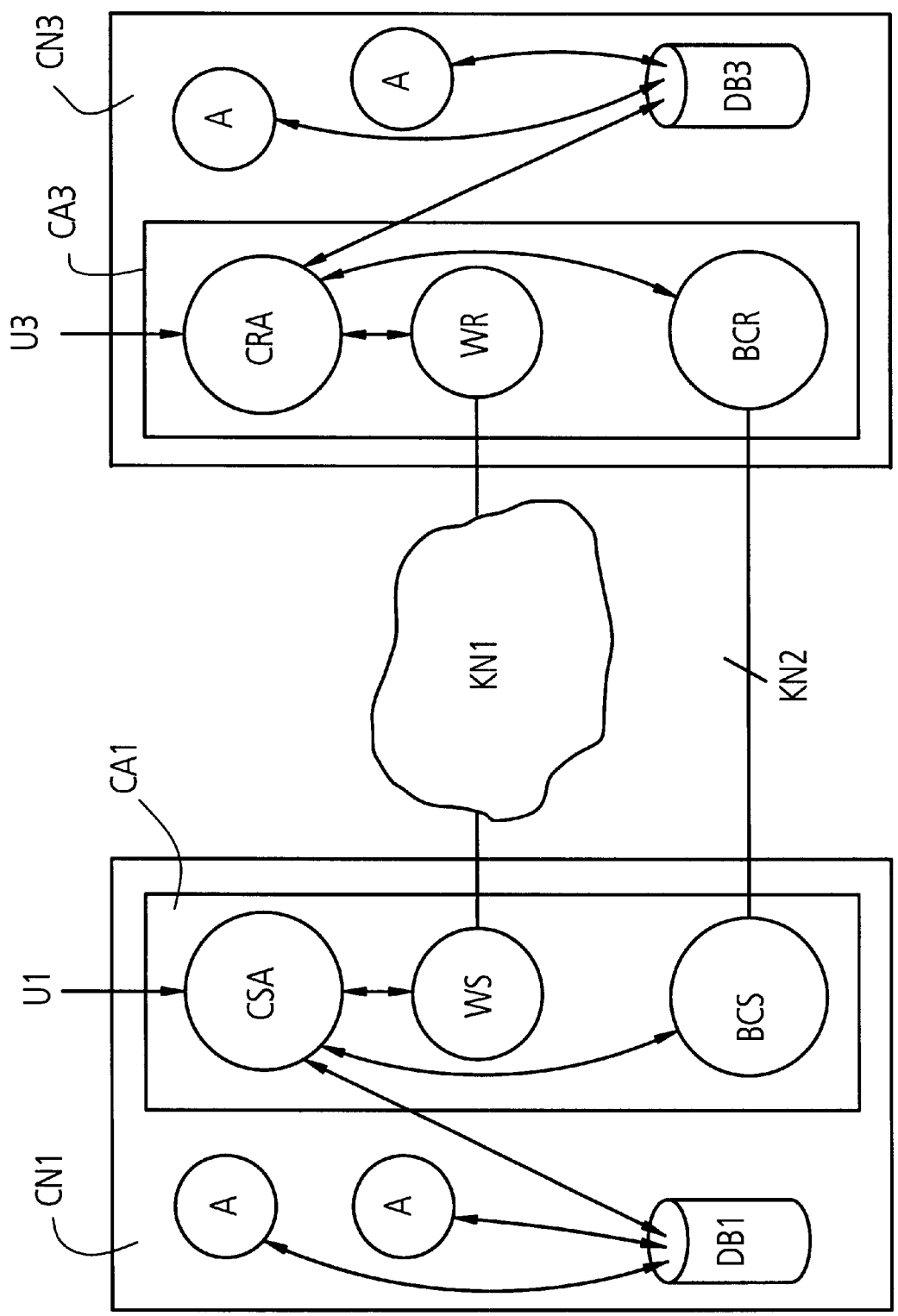
FIG. 2 is a functional diagram illustrating the construction of two computer nodes as illustrated in FIG. 1.

FIG. 2 illustrates the transfer of a data record from the computer node CN1 to the computer node CN3 in the form of one example of the functional construction of the computer nodes CN1 to CN3.

FIG. 2 shows the computer nodes CN1 and CN3, which can be connected to one another by means of the communications networks KN1 and KN2. The computer nodes CN1 have a plurality of applications A, a data base DB1 and a communications application CA1. The computer node CN3 has a plurality of applications A, a data base DB3 and a communications application CA3.

The applications A are each formed by a computer program that can be run on the system platform of the computer node CN1 or CN3, and which make possible the transfer or data and/or the receipt of data to or from other computer nodes CA1 and CA1 respectively. Examples of such application programs include work processing, graphics or file management programs.

The data bases DB1 and DB3 can also be replaced by file systems.

The communications applications CA1 and CA3 are each formed by a computer program that can be run on the system platform of the computer node CN1 or CN3 respectively. The communications applications CA1 and CA3 therefore also exist independently of the computer nodes CN1 or CN3, respectively, for example in the form of a computer program that is stored on a data medium. The mode of operation of the communications applications CA1 and CA3 described below relates to the execution of the communications applications by the computer nodes CN1 and CN3 respectively.

The communications application CA1 hereby transmits a data record which is transmitted to it in the computer node CN1 for transfer to the computer node CN3, transparently for the applications A and the user U1, to the communications application CA3. This communications application CA3 then provides the data record transmitted to it by the communications application CA1 to the computer node CN3. Depending on the type of data record transmitted, it is thereby transmitted in one of a number of different ways from the communications application CA1 to the communications application CA3.

A first option for the transmission of a data record to the communications application CA1 for transfer is thereby that the communications application CA1 provides a user interface for the user U1, by means of which the latter can input commands to initiate the transfer of data records stored in the data base DB1. During the transfer, in response to a command from the user U1, a data record designated by the user U1 is retrieved from the data base DB1 and is transmitted to a computer node selected by the user, in this example the computer node CN3, by the communications application CA1. For this purpose, the user interface advantageously represents a graphical user interface similar to a file management program, an e-mail system or a web browser. It is also possible that the user interface can also be used to select the data records to be transferred, which can be formed by files inside the file system of the computer node CN1.

A second option is that a control message is sent from one of the applications A of the computer node CN1 to the communications application CA1, by means of which the latter application is requested to transfer the data record to one of the computer nodes CN2 to CN3, in this example to the computer node CN3. For this purpose, the application must be specially configured so that, for its part, it must have a corresponding interface with the communications application CA1. The data record itself can thereby be a part of this message, or it can be transmitted with a separate, subsequent message. It is also possible that the message contains a pointer to the location in which the data record to be transferred is stored, and from which location the communications application CA1 retrieves the data record during the transfer.

A first option to provide a data record via the communications application CA3 is that the data record transmitted can be stored in a file or in a data base of the computer node CN3, e.g. in the data base DB3, and then retrieved from there by applications A of the computer node CN3. The data field in which the data record is stored is thereby advantageously defined by the communications application CA3 or by the communications application CA1. The communications application CA3 can also provide a user interface to the user U3, by means of which the user is informed of the data records transmitted by the other computer nodes CN1 to CN3, and by means of which the user can enter commands to initiate the further transfer of a data record transmitted to the computer node CN3 or the further transfer of a data record transmitted to another computer node. In this case, it is advantageous that the data records can be stored in the data base DB3 after they are received, and from which they can then be transmitted by the user U3 to another destination.

A second option for the delivery of a data record by the communications application CA3 is that the communications application CA3 can transfer the data record transmitted to one of the applications A of the computer node CN3. The application A to which the data record is delivered is thereby defined by the application that has transmitted this data record to the communications application CA1 for the transfer. It is also possible for the communications application CA3 to identify this application, for example on the basis of the identity of the computer node from which the data record originated. To transfer the data record to the specified application, the data record is sent to the application in a message, or the data record transmitted is stored in the computer node CN3, and a pointer to the corresponding memory area is transmitted to the specified application.

All of the options described above for the transmission of a data record and for the delivery of a data record can naturally also be performed simultaneously by the communications applications CA1 and CA3.

The communications application CA1 has three program modules CSA, WS and BCS, which are program parts of the computer program from which the communications application CA1 is formed. The program modules CSA, WS and BCS perform the following functions when they are realized as parts of the communications application CA1: The program module CSA represents the access interface for the transmission of a data record to the communications applications CA1, identifies the type of data record being transmitted, and controls the transmission of the data record transmitted by means of the program modules WS and BCS.

The program module CSA distinguishes between two types of data records. The first type of data record it identifies contains mass data. Such data records can contain, for example, images, finished pages, video sequences or a multimedia document. A second type of data record contains the control data or relatively small quantities of data. Such data records can consist, for example, of control data that are exchanged between applications, correction data or status data concerning documents. It is also possible that the program module CSA can distinguish between other types of data records, e.g. between image data and text data on one hand, and control data on the other hand, or between image data on one hand and text data and control data on the other hand.

A first option for the determination of the type of a data record consists of evaluating one or more status parameters of the data record. If the data record in question is, for example, a page that is ready for printing (and thus contains a large quantity of data), which is indicated by a certain status parameter, the system determines that the data record in question is a data record of the first type. The type of the data record can also be indicated by a file name that is assigned to the data record. In that case, the type of data record can also be determined by an evaluation of the file name.

A second option for the identification of the type of data record consists of a determination of the size of the data record. If the size of the data record exceeds a defined threshold, the system determines that the data record in question is a data record of the first type.

A third option for the identification of the type of data record is that the application A which transmits the data record to be transmitted is identified, and a correspondence is established between the type of data record and the application A. Once this correspondence has been established, the type of data record is identified on the basis of the application.

A third option for the determination of the type of data record is that a correspondence is determined between the file or the file area in which the data record is stored, and the type of data record, and the type of data record is identified on the basis of this correspondence.

It is naturally also possible that the type of data record transmitted can be determined by means of an algorithm that determines the type of data record from a combination of the options described above.

If a data record of the first type is identified, the functions of the program module BCS are accessed, and the transmission of the data record is effected via a point-to-point broadband connection established for this data record by the communications network KN2 to the communications application CA3. If a data record of the second type is identified, the functions of the program module WS are accessed, and the connectionless transmission of the data record is effected by the communications network KN1 to the communications application CA3.

It is naturally also possible that the program module CSA can distinguish among more than two types of data records, and transmit the respective types of data records in different ways. For example, for the transmission of different types of data records, point-to-point broadband connections of different bandwidths can be established by different networks. For example, an ISDN connection could be established for a third type of data, and an ATM connection for a fourth type of data.

The program module WS has those function groups of an internet browser that make it possible to identify a data record via the communications network KN1. If the program module WS is called up by the program module CSA, it determines the address of the destination computer node CA3 in the communications network KN1, i.e. the internet address of the computer node CA3, and by means of the function groups described above controls the transmission of a message packet with the data record via the communications network KN1 to the indicated destination address.

The program module BCS has function groups that are required for the establishment of a point-to-point connection by the communications network KN2 and the transmission of data via such a connection (protocol stacks etc.). If the program module BCS is called up by the program module CSA, it identifies the address of the destination computer node CA3 in the communications network KN2, for example the telephone number of the subscriber line by which the computer node CN3 is connected to the communications network KN2. Then it orders the establishment of a point-to-point broadband connection to this destination address and sends the data record via this connection to the computer node CN3.

It is further advantageous if the program module BCS compresses the data record prior to the transmission, and sends it in a compressed mode to the computer node CN3 via the connection.

The program module CSA can also be used to maintain a status list by the program module CSA to coordinate transmission and receipt.

The communications application CA3 has three program modules CRA, WR and BCA, which are parts of the computer program that form the communications application CA3. The program modules CRA, WR and BCR perform the following functions when they are run within the communications application CA3: The program modules WR and BCR have function groups on the receiving side that are analogous to the function groups of the program modules WS and BCS respectively on the transmission side. They also report to the program module CRA the receipt of the data received via the communications networks KN1 and KN2 respectively.

The program module CRA delivers a data record transmitted by one of the computer nodes CN1 to CN2 to the computer node CN3, switches transparently between the different methods of receipt for such data records to be delivered, and controls the receipt of such data records by means of the program modules WS and BCS. If data are received from the computer nodes CN3 by means of the communications networks KN1 or KN2, the receipt is reported to the program module CRA by the program modules WR and BCR. If the data in question are in a data record that was determined by one of the communications applications of one of the computer nodes CN1 to CN2 for delivery to the computer node CN3, the program module CRA determines whether this data record will be transmitted via the communications network KN2 or via the communications network KN1. This determination can be made, for example, by an evaluation of a transmission ID of the transmitting communications application that is sent along with the data record.

In the first case, i.e. if the data record in question is a data record of the first type, the program accesses the functions of the program module BCR and receives the data record by means of the point-to-point broadband connection established on the transmission side by the communications application CA1. In the second case, i.e. if the data record in question is a data record of the second type, the functions of the program module WR are accessed, and the data record is received in a connectionless manner via the communications network KN1 by the communications application CA3.

The switchover between modes of reception can thereby also be controlled by the exchange of commands between the program modules CSA and CRA.

FIG. 2 illustrates by way of example the structure of a transmission-side communications application CA1 and of a receiving-side communications application CA3. It is also naturally advantageous if a communications application of a computer node has both the transmission-side and the receiving-side function groups, and is thus equipped with the program modules CSA, WS, BCS, CRA, WR and BCR. In this case it is advantageous to combine the pairs of program modules CSA and CRA, WS and WR, as well as BCS and BCR into respective single program modules.

What is claimed is:

1. A method of transferring a data record from a first computer node (CN1) to a second computer node (CN3), whereby the data record to be transferred is transmitted to a communications application (CA1) of the first computer node (CN1), from which the data record is then transmitted to a communications application (CA3) of the second computer node (CN3), wherein:

a communications application (CA1) of the first computer node (CN1) identifies a type of the data record and is responsible for determining the transmission method and transmitting the data record to the communications application (CA3) of the second computer node (CN3) in one of several different ways depending on the type of data record identified, whereby if a data record of a first type is identified, the communications application (CA1) of the first computer node (CN1) establishes a point-to-point broadband connection between the first computer node (CN1) and the second computer node (CN3) for the data record, and transmits the data record to the communications application (CA3) of the second computer node (CN3) via this broadband connection, and if a data record of a second type is identified, the communications application (CA1) of the first computer node (CN1) transmits the data record in a connectionless manner (KN1) to the communications application (CA3) of the second computer node (CN3) by means of an internet.

2. A method as claimed in claim 1, characterized in that during the transmission, the data record is transmitted from an application (A) of the first computer node (CN1) to the communications application (CA1) of the first computer node (CN1), and the communications application (CA1) of the first computer node (CN1) transmits the data record thus received to the communications application (CA3) of the second computer node (CN3).

3. A method as claimed in claim 1, characterized in that during the transmission, the communications application (CA1) of the first computer node (CN1), in response to a command, retrieves the data record that is stored in the first computer node (CN1), and transmits the data record retrieved to the communications application (CA3) of the second computer node (CN3).

4. A method as claimed in claim 1, characterized in that the communications application (CA1) of the first computer node (CN1) identifies a data record of the first type if the data record contains mass data.

5. A method as claimed in claim 1, characterized in that the communications application (CA1) of the first computer node (CN1) identifies a data record of the second type if the data record contains control data.

6. A method as claimed in claim 1, characterized in that the communications application (CA1) of the first computer node (CN1) identifies the type of the data record on the basis of one or more status parameters of the data record.

7. A method as claimed in claim 1, characterized in that the communications application (CA1) of the first computer node (CN1) identifies the type of data record on the basis of the quantity of data in the data record.

8. A method as claimed in claim 1, characterized in that one or more simultaneous ISDN connections are established as a point-to-point broadband connection.

9. A method as claimed in claim 1, characterized in that an ATM connection is established as a point-to-point broadband connection.

10. A method as claimed in claim 1, characterized in that the communications application (CA1) of the first computer node (CN1) compresses a data record of the first type and transmits it in compressed form to the communications application (CA3) of the second computer node (CN3).

11. A first computer node (CN1) with a communications application (CA1), the communications application is configured so that it transmits a data record which is transmitted to it for transfer to a second computer node (CN3) through a communications application (CA3) of the second computer node (CN3) wherein, the communications application (CA2) of the first computer node (CN2) is provided with control means (CSA), a first communications means (BCS) and a second communications means (WS), wherein the control means (CSA) are configured to identify a type of the data record transmitted and, as a function of the type of data record identified, directly transmit it to the communications application (CA3) of the second computer node (CN3) in one or more of a number of different ways, whereby the data record is transmitted by means of the first communications means (BCS) if a data record of the first type is identified, and the data record is transmitted by means of the second communications means (WS) if a data record of the second type is identified, wherein if the data record is a data record of a first type, the first communications means (BCS) are configured to directly transmit the data record using an established point-to-point broadband connection between the first computer node (CN1) and the second computer node (CN3), wherein the data record is sent via said broadband connection to the communications application (CA3) of the second computer node (CN3), and if the data record is a data record of a second type, the second communication means (WS) are configured to directly transmit the data record in a connectionless manner via an internet (KN1) to the communications application (CA3) of the second computer node (CN3).

12. A second computer node (CN3) with a communications application (CA3), the communication application (CA3) is configured so that it delivers to the second computer node (CN3) a data record which is transmitted to it by a communications application (CA1) of a first computer node (CN1), wherein;

the communications application (CA3) of the second computer node (CN3) is provided with control means (CRA), first communications means (BCR) and second communications means (WR), such that the control means (CRA) are configured with a delivery switch to receive the data record to be delivered in one or more of a different receiving modes depending on a type of data record from the communications application (CA1) of the first computer node (CA1), and for delivery of the data record to be switched transparently between the different receiving modes, whereby the delivery switch receives the data record by means of the first communications means (BCR) when the data record received is a data record of a first type, and the delivery switch receives the data record by means of the second communications means (WR) when the data record received is a data record of a second type, wherein the first communications means (BCR) are configured to receive the data record to be delivered by means of a point-to-point broadband connection between the first computer node (CN1) and the second computer node (CN3) from the communications application (CA1) of the first computer node (CN1), when the data record is a data record of the first type, and the second communications means (WR) are configured to receive the data record to be delivered in a connectionless manner via an internet (KN1) from the communications application (CA1) of the first computer node (CN1) when the data record is a data record of the second type.

13. A communications application (CA1) for use in a first computer node (CN1) which is configured so that it transmits a data record which is transmitted to it for transfer to a second computer node (CN3) through a communications application (CN3) of the second computer node (CN3), wherein the communications application (CA1) is provided with a first program module (CSA), a second program module (BCS) and a third program module (WS), wherein the first program module (CSA) is configured so that upon execution, the first program module identifies a type of data record being transmitted, and depending on the type of data record identified, the program module transmits the data record in one or more of a number of different ways to the communications application (CA3) of the second computer node (CN3), whereby the communications application (CA1) transmits the data record by means of the second program module (BCS) if it identifies a data record of a first type, and transmits the data record by means of third program module (WS) if it identifies a data record of a second type, the second program module (BCS) is configured so that when the second program module (BCS) is executed for the data record to be transmitted, the second program module BCS brings about the establishment of a point-to-point broadband connection between the first computer node (CN1) and the second computer node (CN3) and the transmission of the data record via said broadband connection to the communications application (CA3) of the second computer node (CN3) if the data record is a data record of the first type, and the third program module (WS) is configured so that when it is executed, the third program module (WS) brings about the transmission of the data record to be transmitted in a connectionless manner via an internet (KN1) to the communications application (CA3) of the second computer node (CA3), if the data record is a data record of the second type.

14. A communications application (CA3) for use in a second computer node (CN3), the communication application (CA3) is configured so that it provides a data record which is transmitted to it from a communications application (CA1) of a first computer node (CN1) to the second computer node (CN3), wherein the communications application (CA3) is provided with a first program module (CRA), a second program module (BCR) and a third program module (WR), wherein the first program module (CRA) is configured so that when it is executed, the first program module receives the data record to be delivered in one or more of a different modes of reception different depending on type of data record, from the communications application (CA1) of the first computer node (CN1), and for the provision of transparent switching between the different modes of reception, whereby the communication application (CA3) it receives the data record by means of the second program module (BCR) when the data record received is a data record of first type, and receives the data record by means of the third program module (WR) when the data record received is a data record of a second type, the second program module (BCR) is configured so that when it is executed, if the data record is a data record of the first type, the second program module receives the data record to be delivered by means of a point-to-point broadband connection between the first computer node (CN1) and the second computer node (CN3) from the communications application (CA1) of the first computer node (CN1), and the third program module (WR) is configured so that when it is executed, if the data record is a data record of the second type, the third program module receives the data record to be delivered in a connectionless manner via an internet (KN1) from the communications application (CA1) of the first computer node (CN1).

15. A method of transferring a data record from a first computer node (CN1) to a second computer node (CN3), whereby the data record to be transferred is transmitted to a communications application (CA1) of the first computer node (CN1), from which the data record is then transmitted to a communications application (CA3) of the second computer node (CN3), wherein:

the communications application (CA1) having a control means (CSA) with a first communication means (BCS) and a second communication means (WS), said control means (CSA) of said communication application (CA1) of the first computer node (CN1) identifies a type of the data record and is responsible for determining the transmission method and transmitting the data record directly to the communications application (CA3) of the second computer node (CN3) in one of several different ways depending on the type of data record identified, whereby if a data record of a first type is identified, the communications application (CA1) of the first computer node (CN1) establishes, via the first communication means (BSC), a point-to-point broadband connection between the first computer node (CN1) and the second computer node (CN3) for the data record, and directly transmits the data record to the communications application (CA3) of the second computer node (CN3) via said broadband connection, and if a data record of a second type is identified, the communications application (CA1) of the first computer node (CN1) directly transmits, via the second communication means (WS), the data record in a connectionless manner (KN1) to the communications application (CA3) of the second computer node (CN3) by means of an internet.

* * * * *